(12) United States Patent
Heaton et al.

(10) Patent No.: US 6,211,638 B1
(45) Date of Patent: **\*Apr. 3, 2001**

(54) METHOD AND APPARATUS FOR LINEARIZING CONTROL OF A RELUCTANCE FORCE MOTOR

(75) Inventors: Mark W. Heaton, Irving; Michael K. Masten, Plano; Michael T. DiRenzo, Coppell, all of TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,879

(22) Filed: Mar. 27, 1998

(51) Int. Cl.[7] ............................. G05B 11/01; G05B 5/01; G11B 5/596

(52) U.S. Cl. ...................... 318/560; 318/615; 360/78.09; 360/78.05

(58) Field of Search ............................. 360/78.04–78.15, 360/78.4; 364/148–151; 318/560–566, 568.22, 615–618, 593; 700/29, 30, 31, 44, 45, 46

(56) References Cited

U.S. PATENT DOCUMENTS

| | | | |
|---|---|---|---|
| 4,195,337 | * | 3/1980 | Bertrand et al. ...................... 364/151 |
| 5,177,652 | * | 1/1993 | Yamaguchi et al. ................ 360/78.05 |
| 5,189,578 | * | 2/1993 | Mori et al. ............................ 360/106 |
| 5,262,707 | * | 11/1993 | Okazaki et al. ...................... 318/592 |
| 5,369,345 | * | 11/1994 | Phan et al. ............................ 318/561 |
| 5,371,449 | * | 12/1994 | Tajima et al. ........................ 318/560 |
| 5,394,071 | * | 2/1995 | Thoen .................................. 318/610 |
| 5,452,153 | * | 9/1995 | Baheri et al. ....................... 360/78.05 |
| 5,521,778 | * | 5/1996 | Boutaghou et al. ................. 360/106 |
| 5,532,565 | * | 7/1996 | Vervoordeldonk .................. 318/610 |
| 5,598,076 | * | 1/1997 | Neubauer et al. ............... 318/568.22 |
| 5,623,461 | * | 4/1997 | Sohmuta ................................ 369/32 |
| 5,631,824 | * | 5/1997 | Khorrami ............................. 364/176 |
| 5,682,362 | * | 10/1997 | Suzuki et al. ......................... 369/32 |
| 5,719,480 | * | 2/1998 | Bock et al. ...................... 318/568.11 |
| 5,745,319 | * | 4/1998 | Takekado et al. ................ 360/78.05 |
| 5,801,939 | * | 9/1998 | Okazaki .......................... 364/167.02 |
| 5,808,435 | * | 9/1998 | Mager .................................. 318/593 |
| 5,920,441 | * | 7/1999 | Cunningham et al. ........... 360/78.05 |

\* cited by examiner

*Primary Examiner*—Brian Sircus
(74) *Attorney, Agent, or Firm*—W. Daniel Swayze, Jr.; Wade James Brady, III; Frederick J. Telecky, Jr.

(57) ABSTRACT

A hard disk drive system (10) includes a rotating magnetic disk (13), an arm (16) moved by a voice coil motor (18), and a read/write head (21) movably supported on the arm by a microactuator (22). The read/write head is moved approximately radially of the disk in response to operation of the microactuator or movement of the arm. The microactuator has a nonlinear transfer function. A control system (62) for controlling the microactuator and the voice coil motor includes a control technique (126) having a nonlinear transfer function which is substantially an inverse of the nonlinear transfer function of the microactuator. Control of the microactuator is effected through the control technique, the control technique linearizing the control of the microactuator.

5 Claims, 3 Drawing Sheets

METHOD AND APPARATUS FOR LINEARIZING CONTROL OF A RELUCTANCE FORCE MOTOR

TECHNICAL FIELD OF THE INVENTION

This invention relates in general to a method and apparatus for controlling a reluctance force motor and, more particularly, to a method and apparatus for linearizing the control of a reluctance force motor having a nonlinear transfer function.

BACKGROUND OF THE INVENTION

Hard disk drive systems have a rotating magnetic disk, an arm movable under control of an actuator which is a voice coil motor, and a read/write head supported on the arm and disposed adjacent to the rotating disk. In response to movement of the arm, the read/write head moves approximately radially of the disk. Some hard disk drive systems of this general type also include a microactuator, which is disposed between the read/write head and the arm, and which can effect movement of the read/write head relative to the arm in a direction radially of the disk. The microactuator can move the read/write head more rapidly than the voice coil motor, but has a substantially smaller range of movement. Therefore, the voice coil motor and moveable arm are used to effect coarse positioning of the read/write head relative to the disk, and the microactuator is used to effect fine positioning of the read/write head relative to the disk.

Such a microactuator may typically include at least one reluctance force motor, such as an electromagnet arrangement having a coil which can be electrically energized to operate the microactuator. One particular type of microactuator has such a reluctance force motor with a highly nonlinear transfer function. In other words, the movement of the read/write head which is effected by the microactuator varies in a highly nonlinear manner with respect to linear variations in a control signal supplied to the microactuator. This nonlinear transfer function of the microactuator creates a relatively complex design problem with respect to development of a control system or control loop to generate the control signal for the microactuator, because a nonlinear control loop is much more complex and difficult to design than a linear control loop.

SUMMARY OF THE INVENTION

From the foregoing, it may be appreciated that a need has arisen for a method and apparatus for controlling a microactuator or other reluctance force motor which has a nonlinear transfer function, and that there is a need for simplifying the design and complexity of a control system or control loop which generates a control signal for such a reluctance force motor. According to the present invention, in order to address this need, a method and apparatus are provided for controlling an apparatus which includes a reluctance force motor having a drive arrangement operative to effect movement of a member away from an initial position in response to a control signal, the drive arrangement having a nonlinear transfer function which causes a displacement of the member from the initial position to vary nonlinearly with respect to variation of the control signal. The method and apparatus involve generating a parameter that represents a desired force to be exerted on the member in order to effect movement of the member away from the initial position thereof, and generating the control signal in response to the parameter according to a nonlinear transfer function which is substantially an inverse of the nonlinear transfer function of the drive arrangement.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
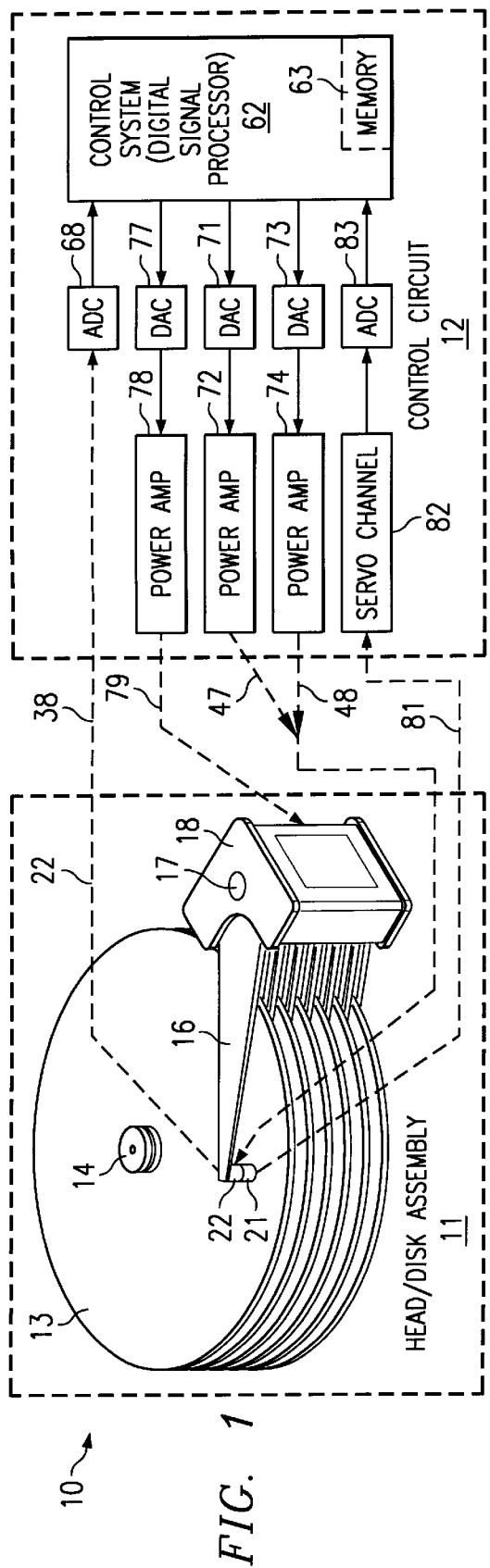
FIG. 1 is a block diagram of a hard disk drive system which embodies the present invention.

FIG. 1 is a diagrammatic view of part of a hard disk drive system 10 which embodies the present invention. The system 10 includes a head/disk assembly 11, and a control circuit 12. FIG. 1 illustrates only those portions of the system 10 which are pertinent to an understanding of the present invention.

The head/disk assembly 11 includes a plurality of magnetic disks 13, which are fixedly secured to a spindle 14. The spindle 14 is rotationally driven by a not-illustrated spindle motor. A plurality of arms 16 are supported for pivotal movement about an axis defined by a pivot axle 17, pivotal movement of the arms 16 being effected under control of a voice coil motor 18. A read/write head 21 is supported on the outer end of each arm by a microactuator 22.

Each of the magnetic disks 13 has thereon a magnetic surface which is organized into a plurality of concentric circular tracks, each track including a plurality of circumferentially distributed sectors. When the voice coil motor 18 effects pivotal movement of the arms 16, the read/write head 21 moves approximately radially with respect to the adjacent magnetic disk 13. The microactuator 22 supports the read/write head 21 for movement relative to the arm 16, in directions approximately radially of the magnetic disk 13, as described in more detail later.

The microactuator 22 can effect movement of the read/write head 21 more rapidly than the voice coil motor 18 and arms 16, but the range of movement of the read/write head 21 by the microactuator 22 is relatively limited, and in particular may typically be on the order of about 10 tracks in either direction. In contrast, the voice coil motor 18 and arms 16 cannot move the read/write head 21 as rapidly as the microactuator 22, but have a wider range of movement, and in particular can move the read/write head 21 into radial alignment with any of the tracks on the magnetic disk 13. The voice coil motor 18 and arms 16 are thus used to effect coarse positioning of the read/write head 21, whereas the microactuator 22 is used to effect fine positioning of the read/write 21.

Figure 2:
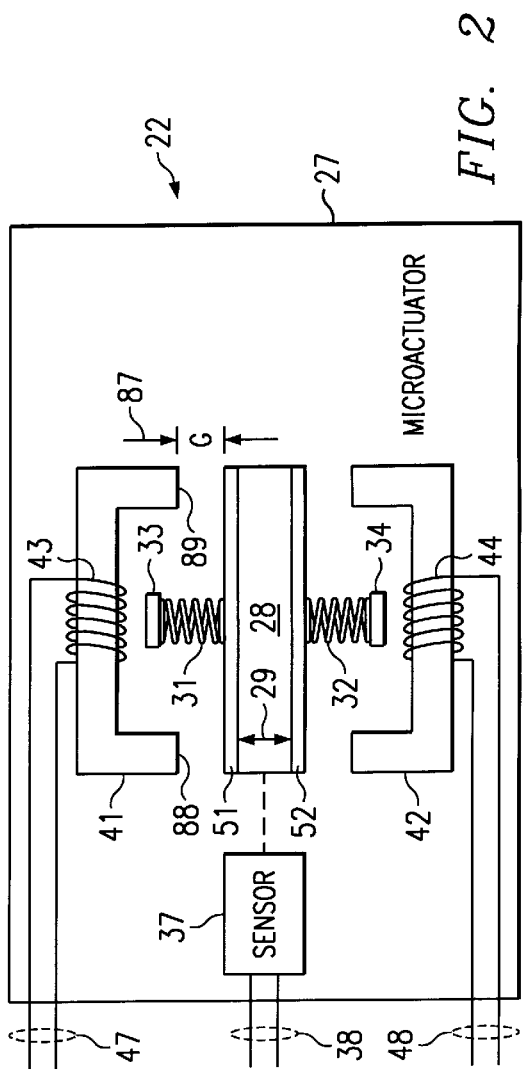
FIG. 2 is a diagrammatic view of a microactuator which is a component of the hard disk drive system of FIG. 1.

FIG. 2 is a diagrammatic view of the microactuator 22. The microactuator 22 has a base 27 which is fixedly mounted to the arm 16, and has a platform 28 which is supported for reciprocal movement relative to the base 27 in the directions indicated by arrows 29. The read/write head 21 is fixedly mounted on the platform 28, so that when the platform 28 moves relative to the base 27 of the microactuator 22, the read/write head 21 moves relative to the arm 16. The microactuator 22 is oriented so that the arrows 29 extend approximately radially of the magnetic disk 13.

The microactuator 22 has spring elements, shown diagrammatically at 31 and 32, which are disposed on opposite sides of the platform 28. The spring elements 31 and 32 each have one end engaging the platform 28 and another end fixedly supported on a respective portion 33 or 34 of the base 27. In the disclosed embodiment, the platform 28 has an initial or equilibrium position, in which neither of the spring elements 31 and 32 is exerting a force on the platform 28. The platform 28 can move away from this initial position in either direction parallel to the arrows 29. If the platform 28 moves away from the initial position in an upward direction in FIG. 2, then the spring element 31 is compressed and the spring element 32 is expanded, so that both exert a resilient force on the platform 28 which tends to yieldably urge the platform 28 back toward its initial position. Similarly, if the platform 28 moves away from the initial position in a downward direction in FIG. 2, the spring element 31 is expanded and the spring element 32 is compressed, so that both resiliently urge the platform 28 back toward its initial position.

The microactuator 22 includes a sensor which is shown diagrammatically at 37, and which outputs at 38 an analog signal representative of the displacement of the platform 28 from its initial position. The microactuator 22 includes two iron elements 41 and 42, which are disposed on opposite sides of the platform 28, and which each have a coil 43 or 44 around a central portion thereof. In FIG. 2, the iron elements 41 and 42 are each U-shaped, but they could have other configurations. An input control signal can be applied at 47 to the coil 43, and an input control signal can be applied at 48 to the coil 44.

A strip 51 of iron material is provided on the platform 28 along an edge thereof nearest the iron element 41, and a further strip 52 of iron material is provided on the opposite side along the edge nearest the iron element 42. In order to effect movement of the platform 28 in an upward direction in FIG. 2, a control signal is supplied at 47 to the coil 43, causing the iron element 41 to act as an electromagnet which attracts the strip 51 on platform 28, so that the platform 28 is pulled upwardly against the urging of the spring elements 31 and 32. Similarly, if a control signal is supplied at 48 to the coil 44, the iron element 42 acts as an electromagnet which magnetically attracts the strip 52 of iron material on platform 28, causing platform 28 to move downwardly in FIG. 2 against the resilient urging of springs 31 and 32. The coil 43, iron element 41 and iron strip 51 serve as one reluctance force motor which can move the platform 28 in one direction. The coil 44, iron element 42 and iron strip 52 serve as another reluctance force motor which can move the platform 28 in an opposite direction.

Referring again to FIG. 1, the control circuit 12 includes a control system 62. In the disclosed embodiment, the control system 62 is a digital signal processor having a program and data memory 63. However, the control system 62 could alternatively be an analog control circuit.

An analog-to-digital converter (ADC) 68 receives the output signal 38 from the sensor 37 of the microactuator 22, converts it to a digital value, and supplies the digital value to an input of the control system 62. The control system 62 outputs a digital value to a digital-to-analog converter (DAC) 71, which converts the digital value to an analog value, and supplies the analog value to a power amplifier 72, the output of which is the control signal 47 for the coil 43 of the microactuator 22. Similarly, the control system 62 outputs a further digital value to a DAC 73, which converts the digital value to an analog value, and supplies the analog value to a power amplifier 74, the output of which is the control signal 48 for the coil 44 in the microactuator 22.

The control system 62 outputs yet another digital value to a further DAC 77, which converts the digital value to an analog value, and supplies the analog value to a power amplifier 78. The output 79 of the power amplifier 78 is a control signal which is supplied to and controls the voice coil motor 18. The read/write head 21 reads servo information from the magnetic disk 13, and this servo information is supplied at 81 to a servo channel circuit 82 disposed within the control circuit 12. The output of the servo channel circuit 82 is supplied to an ADC 83, the digital output of which is supplied to an input of the control system 62. The output of the ADC 83 is a position error signal (PES), which represents the actual radial position of the read/write head 21 with respect to the adjacent magnetic disk 13, as determined in a known manner from servo information read from the disk by the read/write head 21.

Referring to FIG. 2, when the platform 28 is in its initial or equilibrium position, where the spring elements 31 and 32 exert no force on it, there is an initial or equilibrium gap 87 between the iron strip 51 on the platform 28 and the iron element 41 on the base 27. This initial or equilibrium gap is a constant for a given microactuator, and is identified here as the initial gap "G". If the platform 28 is moved upwardly in FIG. 2 away from its initial position by a displacement Δ, the gap between the iron material 51 and iron element 41 will be reduced. The dynamic width of the gap is identified here as "g", where g=(G−Δ).

By applying a control signal at 47 in order to cause a current to flow through the coil 43, the magnetic force exerted by iron element 41 on the iron strip 51 is approximated by the equation $$\text{force} = \frac{\mu_0 N^2 A i^2}{g^2} \tag{1}$$

where $\mu_0$ is the permeability of air, N is the effective number of turns in the coil 43, i is the current flowing through the coil 43, g is the actual air gap (as defined above), and A is the effective area of the flux in the air gap. In the disclosed embodiment, the area A is the sum of the areas of the ends 88 and 89 (FIG. 2) of the iron element 41, which face and are closest to the iron strip 51.

There are, of course, countervailing forces which tend to resist movement of the platform 28 by the electromagnet 41, including the resilient force exerted by the spring elements 31 and 32, as well as the inertia of the platform 28 and the read/write head 21. The cumulative force corresponding to these factors may be expressed by the following equation:

$$\text{force} = Jma\ddot{X} = Kma\Delta \tag{2}$$

where Jma is a constant representing inertial effects, $\ddot{X}$ represents the current acceleration of the platform 28 and the read/write head 21 thereon relative to the base 27, and Kma is a constant representing the stiffness or resilience of the spring elements 31 and 32. In the disclosed embodiment, the stiffness or resilience of the spring elements 31 and 32 does not vary completely linearly with respect to displacement of the platform 28, but may be reasonably approximated by the linear coefficient Kma.

With reference to equation (1) above, it will be recognized that the force magnetically exerted on the platform 28 does not vary linearly with changes in the current i through the coil 43, but instead increases as a function of the square of this current. Thus, equation (1) reflects the fact that the microactuator 22 has a nonlinear transfer function when the force exerted on the platform is defined as a function of the applied control signal.

Figure 3:
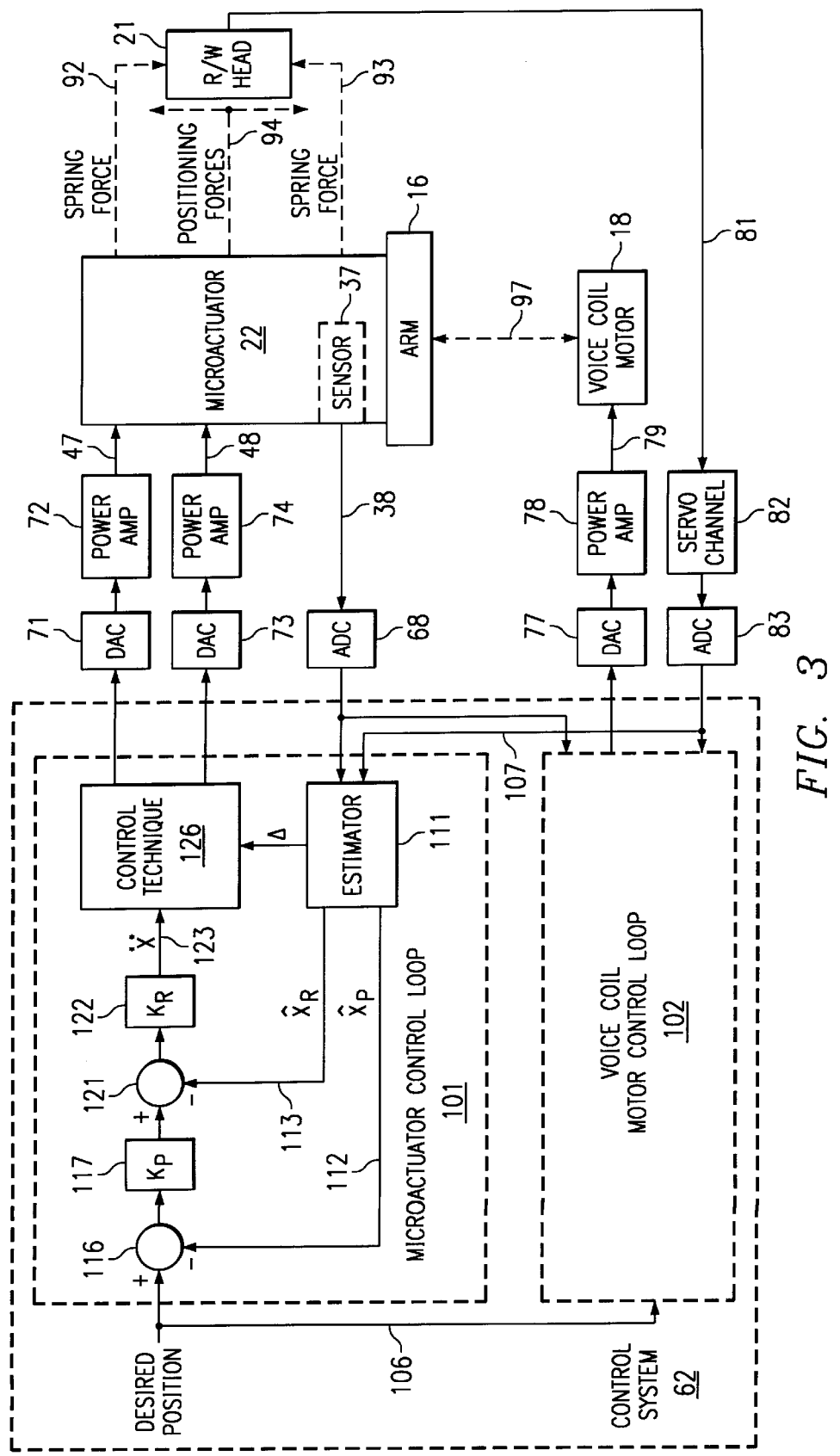
FIG. 3 is a diagrammatic view of part of the hard disk drive system of FIG. 1, showing in greater detail a control system which includes a microactuator control loop for controlling the microactuator of FIG. 2.

FIG. 3 is a diagrammatic view of certain portions of the hard disk drive system 10 of FIG. 1, and provides additional detail regarding the control system 62 therein. In FIG. 3, the broken lines at 92 and 93 diagrammatically represent the forces which can be exerted on the read/write head 21 by the spring elements 31 and 32 (FIG. 2), and 94 indicates the positioning forces which can be exerted on the platform 28 by the electromagnets 41 and 42. The broken line at 97 diagrammatically indicates the movement of arm 16 that is effected by the voice coil motor 18.

FIG. 3 shows that the control system 62 implements a microactuator control loop 101, and a voice coil motor control loop 102. The control loops 101 and 102 are both responsive to a parameter 106 representing a desired radial position of the read/write head 21, and are both responsive to the position error signal (PES) 107 received through the ADC 83 and servo channel circuit 82 from the read/write head 21. The microactuator control loop 101 is also responsive to the signal received through the ADC 68 from the sensor 37, representing the position of the platform 28 of the microactuator. The microactuator control loop 101 outputs two values, which are respectively supplied to the DAC 71 and the DAC 73, and which respectively represent the control signals to be applied to the microactuator coils 43 and 44. The voice coil motor control loop 102 outputs a value which is supplied through DAC 77 and power amplifier 78 to the voice coil motor 18, in order to control the voice coil motor 18.

The microactuator control loop 101 includes an estimator circuit 111, which receives the position error signal 107, and the output signal from the sensor 37. The estimator 111 outputs a signal A, which is based on the output signal from the sensor 37, and which represents the displacement of the platform 28 from its initial position, as defined above. For example, the sensor may produce an output signal which is a nonlinear representation of the displacement, and the estimator 111 may generate the signal Δ by linearizing the output signal from the sensor 37. The estimator 111 also outputs two signals 112 and 113, which respectively represent an estimated position and an estimated rate or velocity of both the platform 28 and the read/write head 21 thereon.

A summing junction 116 determines the difference between the desired position 106 and the estimated position 112, and supplies this difference to a gain element 117, which multiplies the difference by a position gain $K_p$. A further summing junction 121 determines the difference between the output of the element 117 and the estimated rate 113, and outputs the result to an element 122. The element 122 multiplies the output of summing junction 121 by a rate or velocity gain $K_R$. The output of the element 122 is a value 123, which represents a desired acceleration $\ddot{X}$ for the platform 28 and read/write head 21. The microactuator control loop 101 includes a control technique 126, which receives the desired acceleration value 123 from the element 122, and which also receives the signal Δ from the estimator 111. The control technique 126 outputs two values, which are respectively supplied to the DAC 71 and the DAC 73, and which each represent the control signal to be applied to a respective one of the coils 43 and 44 of the microactuator.

As discussed above in association with equation (1), the microactuator 22 has a nonlinear transfer function when the positioning force applied to the platform 28 is expressed as a function of a control signal supplied to one of the coils 43 or 44 at either 47 or 48. If the overall microactuator control loop 101 had to be of nonlinear design in order to account for the nonlinear transfer function of the microactuator 22, the overall microactuator control loop 101 would be very complex, and would be cumbersome to design. In order to avoid this problem, the control technique 126 has been provided in the microactuator control loop 101.

As discussed in more detail later, the control technique 126 is designed to have a transfer function which is effectively the inverse of the transfer function of the microactuator 22. Thus, the rest of the microactuator control loop 101 can be linear, and therefore less complex and easier to design. In particular, the rest of the control loop 101 is linear and generates at 123 a signal which is linear, and the positioning force which is exerted at 94 on the platform 28 and read/write head varies linearly with the value 123. The manner in which this is achieved may be derived mathematically, as discussed below in association with equations (3) through (7).

More specifically, as discussed above, equation (1) represents the force which one of the electromagnets can exert on the platform 28 of the microactuator, and equation (2) represents the countervailing force which resists movement of the platform 28 by the electromagnet. In order for the platform to remain in a given position, these forces must be equal and opposite, and equations (1) and (2) can therefore be combined as shown below:

$$\frac{\mu_0 N^2 A i^2}{g^2} = Jma\ddot{X} + Kma\Delta \qquad (3)$$

Solving equation (3) for the current i yields the following:

$$i = \sqrt{Jma\left(\ddot{X} + \frac{Kma}{Jma}\Delta\right) \cdot g^2 \cdot \left(\frac{1}{\mu_0 N^2 A}\right)} \qquad (4)$$

Since V=IR, it is possible to substitute V/R for i in equation (4), and to then solve for the voltage V, as follows:

$$V = R\sqrt{\left(\ddot{X} + \frac{Kma}{Jma}\Delta\right) \cdot g^2 \cdot \frac{Jma}{\mu_0 N^2 A}} \qquad (5)$$

$$V = \sqrt{\ddot{X} + \frac{Kma}{Jma}\Delta} \cdot g \cdot R\sqrt{\frac{Jma}{\mu_0 N^2 A}} \qquad (6)$$

$$V = \sqrt{\ddot{X} + \frac{Kma}{Jma}\Delta} \cdot g \cdot kf_{comp} \qquad (7)$$

where $Kf_{comp} = R\sqrt{\frac{Jma}{\mu_0 N^2 A}}$

Figure 4:
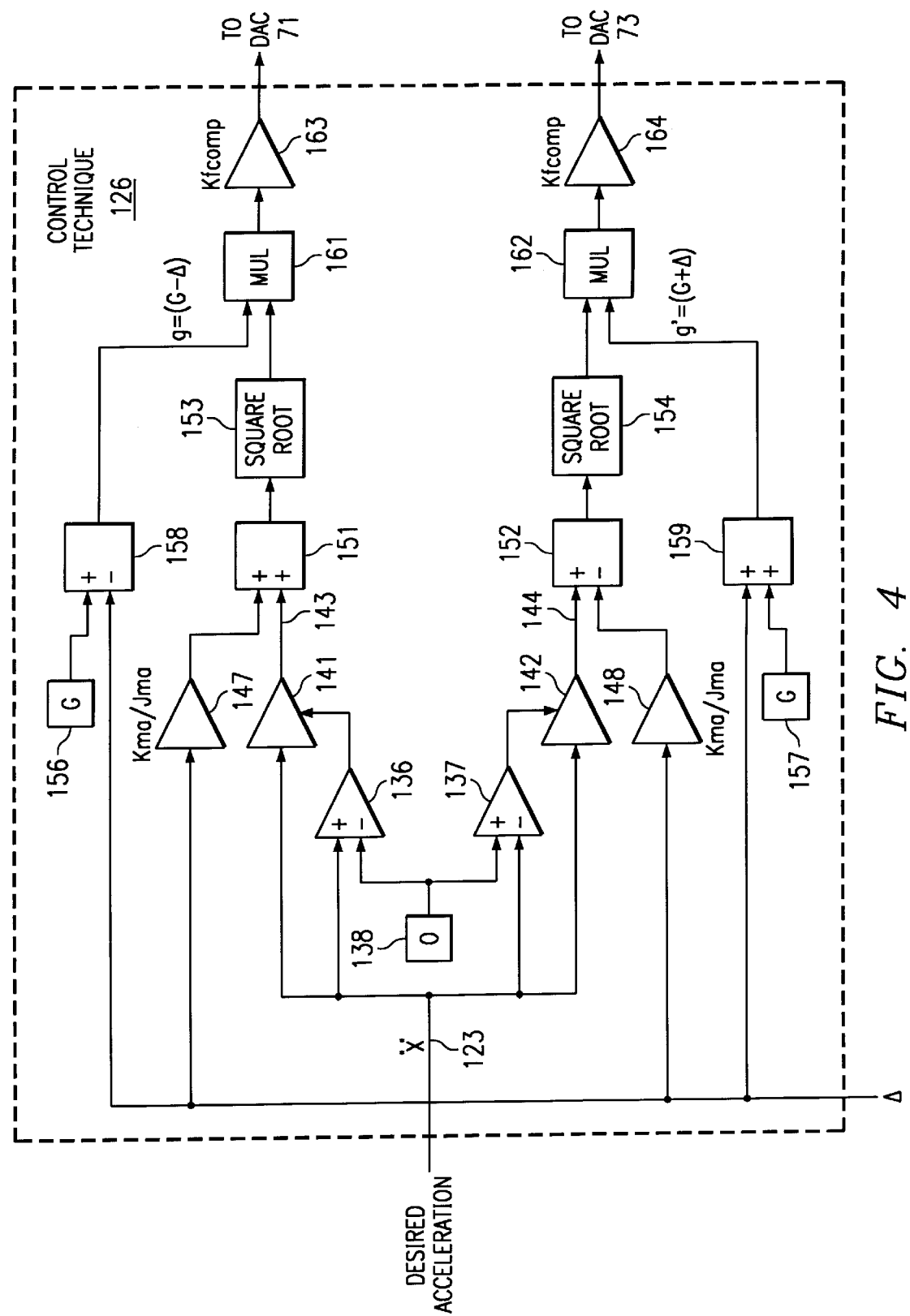
FIG. 4 is a control diagram for a control technique which is a component of the microactuator control loop depicted in FIG. 3.

Equation (7) represents the transfer function which must be separately implemented by the control technique 126 for each of its two outputs, in order to realize the inverse of the transfer function of the microactuator 22 as to each such output. FIG. 4 is a control diagram of the control technique 126, depicting one suitable approach for implementing equation (7) with respect to each of the outputs of the control technique 126.

Referring in detail to FIG. 4, the desired acceleration value 123 is supplied to inputs of two comparators 136 and 137, which each compare the desired acceleration value 123 to a reference value 138, which in the disclosed embodiment is zero. If the desired acceleration 123 is positive, the output of the comparator 136 is actuated and the output of the comparator 137 is deactuated, whereas if the desired acceleration value 123 is negative, the output of the comparator 136 is deactuated and the output of the comparator 137 is actuated.

The output of comparator 136 enables and disables a buffer 141, and the output of comparator 137 enables and disables a buffer 142. The buffers 141 and 142 each have applied to an input thereof the desired acceleration value 123. Thus, when the desired acceleration value 123 is greater than zero, the buffer 141 is enabled and supplies the desired acceleration value 123 to its output 143, at which time the buffer 142 is disabled and its output 144 is zero. In contrast, if the desired acceleration value 123 is negative, the buffer 142 will be enabled and will supply the desired acceleration value 123 to its output 144, at which time the buffer 141 is disabled and its output 143 is zero. Stated differently, if the desired acceleration value 123 is positive, the output 143 of buffer 141 will be active and will cause a control signal to be supplied to the coil 43 of the microactuator in order to effect movement of the platform 28 away from its initial position in one direction. In contrast, if the desired acceleration value 123 is negative, the output 144 of buffer 142 will be active and will cause a control signal to be supplied to the coil 44 of the microactuator in order to effect movement of the platform 28 away from its initial position in an opposite direction.

The signal Δ from the estimator 111, which represents the actual displacement of the platform 28 from its initial position, is supplied to each of two identical gain elements 147 and 148. The gain elements 147 and 148 each have a gain of Kma/Jma, where Kma and Jma are as defined above in association with equation (2). The outputs of buffer 141 and gain element 147 are combined by a summing junction 151, after which an element 153 determines the square root of the result. Similarly, the outputs of elements 142 and 148 are combined by a summing junction 152, and then an element 154 determines the square root of that result.

Two elements 156 and 157 each generate a constant reference value G which, as discussed above, represents the initial gap 87 (FIG. 2) between the platform 28 and each electromagnet when the platform is in its initial position. Two summing junctions 158 and 159 each combine the reference value G with the platform displacement A, so that element 158 determines the actual air gap g=(G−Δ) on one side of the platform, and the element 159 determines the air gap g'=(G+Δ) on the opposite of the platform. A multiplier 161 multiplies the outputs of elements 153 and 158, and a multiplier 162 multiples the outputs of elements 154 and 159.

A gain element 163 scales the output of multiplier 161 by a constant $Kf_{comp}$, and a gain element 164 scales the output of multiplier 162 by the same constant. The constant $Kf_{comp}$ is the same constant defined above in association with equation (7). It will be recognized from a brief review of FIG. 4 that, when the desired acceleration value 123 is positive, so that the buffer 141 is enabled, a mathematical representation of the transfer function of the control technique 126 with respect to the output of element 163 is identical to equation (7) above. The transfer function of the control technique 126 with respect to the output of element 164 may be represented by a similar equation.

The present invention provides various technical advantages. One important technical advantage is the linearization of the control of a reluctance force motor or microactuator having a nonlinear transfer function. By eliminating a highly nonlinear control problem, the design of the control loop can be linearized and thus substantially simplified.

Although one embodiment has been illustrated and described in detail, it should be understood that various changes, substitutions and alterations can be made therein without departing from the scope of the present invention. In this regard, the present application discloses in a diagrammatic manner a particular microactuator with which the present invention may be utilized, but it will be recognized that the present invention is suitable for use with any microactuator or other reluctance force motor having a nonlinear transfer function. Further, the present application discloses an exemplary control technique which implements a particular transfer function, but it will be recognized that the control technique can be implemented differently while still achieving the same transfer function, and could be implemented differently in order to realize other transfer functions. It should also be recognized that direct connections disclosed herein could be altered, such that two disclosed components or elements would be coupled to one another through an intermediate device or devices without being directly connected, while still realizing the present invention. Other changes, substitutions and alterations, including the reversal and rearrangement of parts, are also possible without departing from the spirit and scope of the present invention, as defined by the following claims.

What is claimed is:

1. A hard disk drive system, comprising:

a rotatably supported magnetic disk;

a member supported for movement relative to said disk;

an actuator for effecting a first movement of said member;

a microactuator supported on said member, said microactuator having a base secured to said member, having a platform supported for a second movement relative to said base, and having a drive arrangement which is operative to effect said second movement of said platform away from an initial position relative to said base in response to a control signal, said drive arrangement having a linear transfer function and a nonlinear transfer function which causes a displacement of said platform from the initial position to vary linearly and nonlinearly with respect to variation of the control signal;

a read/write head supported on said platform of said microactuator, said read/write head being adjacent to said disk and being moved substantially radially of said disk in response to said first movement of said member by said actuator and in response to said second movement of said platform relative to said base; and a single control loop which is operative to generate the control signal, said single control loop including a first portion operative to generate a first signal that represents a linear force to be exerted on said platform in order to effect movement of said platform away from the initial position thereof, and a second portion which is operative to generate a second signal, said control signal being a function of said first signal and said second signal, said second portion operative to generate said second signal having a nonlinear transfer function which is substantially an inverse of the nonlinear transfer function of said drive arrangement.

2. An apparatus according to claim 1, wherein said microactuator includes a resilient arrangement which is operative to yieldably resist movement of said platform away from the initial position thereof.

3. An apparatus according to claim 1, wherein said drive arrangement includes a coil provided on one of said base and said platform, and includes an iron part provided on the other thereof, the control signal being applied to said coil.

4. An apparatus according to claim 1, wherein said microactuator includes a sensor arrangement which is operative to generate an output signal representing a displacement of said platform from the initial position thereof, and wherein said second portion of said control section is responsive to the output signal from said sensor arrangement.

5. A hard disk drive system, comprising:

a rotatably supported magnetic disk;

a member supported for movement relative to said disk;

an actuator for effecting movement of said member;

a microactuator supported on said member, said microactuator having a base secured to said member, having a platform supported for movement relative to said base, and having a drive arrangement which is operative to effect movement of said platform away from an initial position relative to said base in response to a control signal, said drive arrangement having a nonlinear transfer function which causes a displacement of said platform from the initial position to vary nonlinearly with respect to variation of the control signal;

a read/write head supported on said platform of said microactuator, said read/write head being adjacent said disk and being moved substantially radially of said disk in response to movement of said member by said actuator and in response to movement of said platform relative to said base; and a control section which is operative to generate the control signal, said control section including a first portion operative to generate a parameter that represents a desired force to be exerted on said platform in order to effect movement of said platform away from the initial position thereof, and a second portion which is operative to generate the control signal in response to the parameter, said second portion having a nonlinear transfer function which is substantially an inverse of the nonlinear transfer function of said drive arrangement, wherein said microactuator includes a resilient arrangement which is operative to yieldably resist movement of said platform away from the initial position thereof;

wherein said drive arrangement includes a coil provided on one of said platform and said base, and includes an iron part provided on the other thereof, the control signal being applied to said coil;

wherein said microactuator includes a sensor arrangement which is operative to generate a signal representing a displacement of said platform away from the initial position thereof, said second portion of said control section being responsive to the signal from said sensor arrangement;

wherein the nonlinear transfer function of said drive arrangement is defined by $$\text{force} = \frac{\mu_0 N^2 A i^2}{g^2}$$

wherein $\mu_0$ is the permeability of air, N is the effective number of turns in said coil, i is the current through said coil, g is the size of an air gap between said coil and said iron part, and A is an effective area of the flux in the air gap; and wherein the nonlinear transfer function of said second portion is defined by $$i = \sqrt{Jma\left(\ddot{X} + \frac{Kma}{Jma}\Delta\right) \cdot g^2 \cdot \left(\frac{1}{\mu_0 N^2 A}\right)}$$

where $\ddot{X}$ is the parameter representing the desired force, Kma is a constant representing a characteristic of said resilient arrangement, Jma is a constant representing an inertia associated with said platform and said read/write head, and $\Delta$ is the displacement of said platform away from the initial position thereof.

* * * * *